US006587577B1

(12) United States Patent
Finkelstein (10) Patent No.: US 6,587,577 B1
(45) Date of Patent: Jul. 1, 2003

(54) ON-LINE SIGNATURE VERIFICATION (75) Inventor: Lev Finkelstein, Netanya (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/295,944

(22) Filed: Apr. 21, 1999

(51) Int. Cl.[7] .................................. G06K 9/00
(52) U.S. Cl. .................. 382/123; 382/116; 382/160; 382/187; 382/209
(58) Field of Search ............................ 382/155–159, 382/116, 119, 123, 224, 187, 209, 160

(56) References Cited

U.S. PATENT DOCUMENTS

| | | | |
|---|---|---|---|
| 4,024,500 A | | 5/1977 | Herbst et al. |
| 4,040,010 A | | 8/1977 | Crane et al. |
| 4,128,829 A | | 12/1978 | Herbst et al. |
| 4,454,610 A | | 6/1984 | Sziklai |
| 4,724,542 A | | 2/1988 | Williford |
| 4,789,934 A | | 12/1988 | Gundersen et al. |
| 4,901,358 A | | 2/1990 | Bechet |
| 4,972,496 A | | 11/1990 | Sklarew |
| 4,985,928 A | | 1/1991 | Campbell et al. |
| 5,022,086 A | | 6/1991 | Crane et al. |
| 5,040,222 A | | 8/1991 | Muroya |
| 5,111,512 A | | 5/1992 | Fan et al. |
| 5,251,265 A | * | 10/1993 | Dohle et al. ................. 382/119 |
| 5,459,798 A | | 10/1995 | Bailey et al. |
| 5,491,758 A | | 2/1996 | Bellegarda et al. |
| 5,517,579 A | | 5/1996 | Baron et al. |
| 5,533,141 A | | 7/1996 | Futatsugi et al. |
| 5,544,255 A | | 8/1996 | Smithie et al. |
| 5,559,895 A | * | 9/1996 | Lee et al. ................... 382/119 |
| 5,560,039 A | | 9/1996 | Dulong |
| 5,621,818 A | | 4/1997 | Tashiro |
| 5,647,017 A | | 7/1997 | Smithies et al. |
| 5,680,470 A | | 10/1997 | Moussa et al. ............. 382/119 |
| 5,717,908 A | | 2/1998 | Dulong |
| 5,745,598 A | | 4/1998 | Shaw et al. |
| 5,768,417 A | * | 6/1998 | Errico et al. ................ 382/186 |
| 5,802,200 A | * | 9/1998 | Wirtz ......................... 382/119 |
| 5,825,906 A | * | 10/1998 | Obata ......................... 382/119 |
| 5,892,824 A | * | 4/1999 | Beatson et al. ............. 380/25 |
| 6,118,889 A | * | 9/2000 | Izuno et al. ................ 382/119 |
| 6,424,728 B1 | * | 7/2002 | Ammar ....................... 382/116 |

OTHER PUBLICATIONS

R. Plamondon, "Progress in Automatic Signature Verification", Machine Perception Artificial Intelligence, vol. 13, pp. 128.
M. Hanan, et al., "Finite State Machine Decision Procedure Model for Signature Verification", IBM Tech.Discl.Bull. 20 (1978), pp. 3355–3360.
M. Yasuara, et al., "Signal Verification Experimental Based on Non–Linear Time Alignment", IEEE Trans. Sys. Man Cybernetics 17 (1977), pp. 212–216.
D. Sankoff and j.B. Kruskal, eds. "Time Warps, String Edits, and Macromolecules: The Theory and Practice of Sequence Comparison", Adison—Wesley, 1983, pp. 125–161.
Eyal Yair & Allen Gersho, "The Boltzmann Perception Network—A Soft Classifier", in Journal of Neural Networks, vol. 3, (Mar. 1990), 203–221.
J. Ross Quinlan, in "C4.5 Programs for Machine Learning", Morgan Kaufman (1993), ISBN 1558602380, pp. 17–26.

* cited by examiner

Primary Examiner—Bhavesh M. Mehta
Assistant Examiner—Gregory Desire
(74) Attorney, Agent, or Firm—Darby & Darby (57) ABSTRACT A method of determining whether a test sample belongs to the same individual as a plurality of reference samples. The method includes providing respective values of one or more identifying features from the test sample and the plurality of reference samples, representing the test and reference samples by respective points having coordinates in a multi-dimensional space indicative of the respective feature values, and deciding whether the test sample belongs to the same individual as the plurality of reference samples based on a geometrical property of the points.

29 Claims, 3 Drawing Sheets

ON-LINE SIGNATURE VERIFICATION

FIELD OF THE INVENTION

The present invention relates generally to identity verification, and specifically to on-line determination of whether an identifying sample, such as a signature, belongs to the same owner as a plurality of reference samples.

BACKGROUND OF THE INVENTION

A large amount of work has been performed regarding identity verification. In general the problem attempted to be solved in identity verification is: given a plurality of identifying reference samples and a test sample, does the test sample belong to the owner of the reference samples? The samples may be signatures, voice samples, face pictures, etc.

Due to the complexity of the human handwriting and the difference between pluralities of authentic signatures made by a given person, signature verification is very complex. The success of a solution is generally classified according to two variables: the percentage of forgeries which were identified as authentic (false positive), and the percentage of authentic signatures identified as forgeries (false negative).

Various features of signatures are used in signature verification. These features include the geometrical shape of the signature, the speed at which the signature was signed, the number of times the pen was lifted, the pressure of the pen on a pad on which the signature was signed, etc. None of these features are generally distinctive enough so that all signatures of a single individual will have the same value of the feature. Therefore, a plurality of reference signatures are taken from the individual, and the test signature is verified against the plurality of reference signatures.

"Progress in Automatic signature Verification" edited by R. Plamondon, which is incorporated herein by reference, describes various methods of signature verification. A first method includes generating an average signature from the reference signatures and comparing the test signature with the average signature. Such a method is also described for example, in U.S. Pat. No. 4,040,010, which is incorporated herein by reference. In this method, data descriptive of the reference signatures is lost due to the averaging.

In a second method, described, for example, in U.S. Pat. No. 4,724,542, which is incorporated herein by reference, the test signature is compared to each of the plurality of samples and is considered authentic if it is close enough to one of the samples. In this method a large number of reference signatures are required in order to achieve suitable results.

U.S. Pat. No. 5,111,512, which is incorporated herein by reference, describes a method in which a first reference signature is chosen from a plurality of samples, and a second reference signature is constructed by averaging the samples. Some features of the test signature are compared to the first reference signature, while others are compared to the second reference signature. However, this method still does not overcome the problem of information loss due to the averaging.

U.S. Pat. No. 5,680,470, which is incorporated herein by reference, describes a method in which the features of reference signatures are stored in an associative memory. A test signature is compared to the reference signatures using the associative memory. However, the features of the reference signatures may be so diverse as not to allow the associative memory to generate internal rules governing the differences between true and false signatures. For better results, it is desirable to more closely define for the associative memory the points of comparison between the reference signatures and the test signature.

SUMMARY OF THE INVENTION

It is an object of some aspects of the present invention to provide methods for determination whether a given test sample belongs to the same person as a plurality of reference samples.

It is another object of some aspects of the present invention to provide methods for reliable determination of whether a given test sample belongs to a given person using a relatively low number of reference samples.

It is another object of some aspects of the present invention to provide a relatively simple method and apparatus for determining whether a signature is authentic.

It is another object of some aspects of the present invention to provide methods and apparatus for fast determination of whether a signature is authentic.

In preferred embodiments of the present invention, a processor receives a plurality of reference samples and a test sample, for example, samples of a person's signature, and calculates a correlation value between each pair of the samples for each of one or more features of the samples which are identified by or input to the processor. For each of the one or more features, a matrix of the correlation values is formed, and the processor evaluates the regularity of the matrix. The test sample is labeled as authentic if the matrix has a predetermined measure of regularity. In other words, the test sample is identified as authentic if the regularity of its correlation with the reference samples is similar to the regularity of the correlation of the reference samples with one another. Thus, unlike methods of signature identification known in the art, the method used in preferred embodiments of the present invention identifies the test sample as authentic not if it is closely correlated with one of the reference samples, but rather if its degree of correlation (and deviation from full correlation) with the reference samples is comparable to the degree of correlation between the reference samples.

In some preferred embodiments of the present invention, the regularity of the matrix is evaluated by forming a set of points in an n-Euclidean space (n being the number of reference samples) which is representative of the matrix, and evaluating the regularity of the points of the set. Preferably, the points of the set are generated such that the distances between the points are the correlation values of the matrix. Preferably, the set includes n points representative of the reference samples and one test point representative of the test sample.

In some preferred embodiments of the present invention, the regularity of the points of the set is evaluated by evaluating the regularity of a test polyhedral formed of the points. Preferably, in order to establish authenticity of the test sample, the test polyhedral must have a shape resembling a reference polyhedral formed from the points corresponding to the reference samples. Preferably, one or more parameters representative of the relation between the test point and the test polyhedral are calculated. The one or more parameters are preferably normalized by dividing them by an average of the values of the parameters calculated for each of the reference points corresponding to the reference samples. The normalized parameters of each set of points representing a particular feature are used to determine whether the test sample is authentic.

In some preferred embodiments of the present invention, the one or more parameters comprise two parameters: a height of the polyhedral, and a variance of the test point relative to the polyhedral.

In some preferred embodiments of the present invention, the determination whether the sample is authentic is performed by providing the one or more parameters of each of the one or more features to a suitably trained neural network. Preferably, the neural network comprises a Boltzmann Perceptron classifier, although other networks may be used. Alternatively or additionally, other classifiers may be used instead of neural networks, such as a decision tree (for example, an ID3-type tree), as is known in the art.

In some preferred embodiments of the present invention, the samples comprise signatures of a human individual. Preferably, the features of the signatures comprise features indicative of the correlation between two signatures. Therefore, the correlation values of the matrix are given by the values of the features. Preferably, the features include an absolute speed mismatch, an average speed mismatch, a uniformity of point-to-point correspondence, and a shape difference, all of which are calculated based on measurements made on the two signatures in accordance with methods of signature identification known in the art. Preferably, the features further include the lengths of the two signatures. Any other features known in the art of signature identification and authentication may similarly be used for this purpose.

Alternatively or additionally, the features may include features of single signatures, such as any of the 25 features mentioned on page 128 of the aforementioned "Progress in Automatic Signature Verification." The correlation values used as the terms of a matrix relating to a single feature are therefore equivalent to the differences between the values of the feature for each respective pair of signatures. Alternatively or additionally, other functions of the features of the pair of signatures, such as the minimum or average of the feature values, may be used to form the terms of the matrix.

In some preferred embodiments of the present invention, the processor receives more than n reference samples and discards one or more of the samples so as to remain with n reference samples. Preferably, the discarded samples are chosen as the samples most inconsistent with the rest of the reference samples.

There is therefore provided in accordance with a preferred embodiment of the present invention, a method of determining whether a test sample belongs to the same individual as a plurality of reference samples, including providing respective values of one or more identifying features from the test sample and the plurality of reference samples, presenting the test and reference samples by respective points having coordinates in a multi-dimensional space indicative of the respective feature values, and deciding whether the test sample belongs to the same individual as the plurality of reference samples based on a geometrical property of the points.

Preferably, providing the respective values includes extracting from the samples a plurality of values of the one or more features descriptive of the samples, and representing the samples by one or more geometric points includes representing each sample by one point for each of the one or more features.

Preferably, at least some of the one or more features include a value dependent on a comparison of two of the samples.

Preferably, representing each of the test and reference samples by one or more geometric points includes generating for each of the one or more features, a square matrix in which each row and each column is representative of one of the samples, and in which the values of the terms of the matrix are responsive to the value of the feature of the samples of the row and column of the term, and generating for each matrix a plurality of points representative of the matrix.

Preferably, generating the plurality of points representative of the matrix includes smoothing the matrix and generating the points based on the smoothed matrix.

Preferably, smoothing the matrix includes applying a square root operator to the terms of the matrix.

Alternatively or additionally, smoothing the matrix includes generating a symmetrical matrix responsive to the matrix to be smoothed.

Preferably, representing the test and reference samples by respective points includes generating the points such that the distances between the points are proportional to the respective values of the features.

Preferably, deciding based on the geometrical property of the points includes deriving a parameter indicative of the regularity of a polyhedron formed from the points.

Preferably, deriving the parameter includes deriving parameters indicative of the relative form of a polyhedron including points representing both the test and reference samples compared to a polyhedron including points representing only the reference samples.

Further preferably, deriving parameters indicative of the relative form of the polyhedrons includes deriving relative heights and variances of the polyhedrons.

Preferably, deciding whether the test sample belongs to the same individual as the reference samples includes inputting the parameters to a classifier.

Preferably, the classifier includes a neural network.

Preferably, the samples include signatures.

Preferably, providing the respective values includes performing a dynamic time warping technique on the samples.

Preferably, providing the respective values includes determining a speed mismatch of the samples.

Preferably, representing the test and reference samples by the respective points includes representing the samples by n-dimensional points wherein n is the number of reference samples.

Preferably, representing the test and reference samples by the respective points includes representing the samples such that each of the points has a different number of non-zero coordinates.

Further preferably, the test sample is represented by a point substantially all of whose coordinates are non-zero.

Preferably, the method includes eliminating one or more of the reference samples prior to representing the test and reference samples by the respective points.

There is further provided in accordance with a preferred embodiment of the present invention, apparatus for determining whether a test sample belongs to the same individual as a plurality of reference samples, including an input device which acquires the samples a processor which determines values of one or more features of the samples, represents the samples by corresponding points in a multi-dimensional space having coordinates indicative of the feature values, and calculates a geometrical property of the points, and a classifier which determines whether the test sample belongs to the same individual as the plurality of reference samples responsive to the geometrical property.

Preferably, the samples include signatures, and the input device includes a writing implement.

Preferably, the input device does not determine a pressure of the writing implement on a pad.

Preferably, the classifier includes a neural network.

Preferably, the classifier is implemented by software in the processor.

Preferably, the processor represents each sample by one point for each of the one or more features.

Preferably, the processor determines values of the one or more features using a dynamic time warping technique.

Preferably, the processor calculates the geometrical property by deriving parameters indicative of the relative form of a polyhedron including points representing both the test and reference samples compared to a polyhedron including points representing only the reference samples.

There is also provided, in accordance with a preferred embodiment of the present invention, a computer program product having computer readable program code embodied therein, which code causes a processor receiving a test sample and a plurality of reference samples, wherein each sample is characterized by respective values of one or more identifying features, to represent the test and reference samples by respective points having coordinates in a multi-dimensional space indicative of the respective feature values, and to decide whether the test sample belongs to the same individual as the plurality of reference samples based on a geometrical property of the points.

The present invention will be more fully understood from the following detailed description of the preferred embodiments thereof, taken together with the drawings, in which:

DETAILED DESCRIPTION OF PREFERRED EMBODIMENTS

Figure 1:
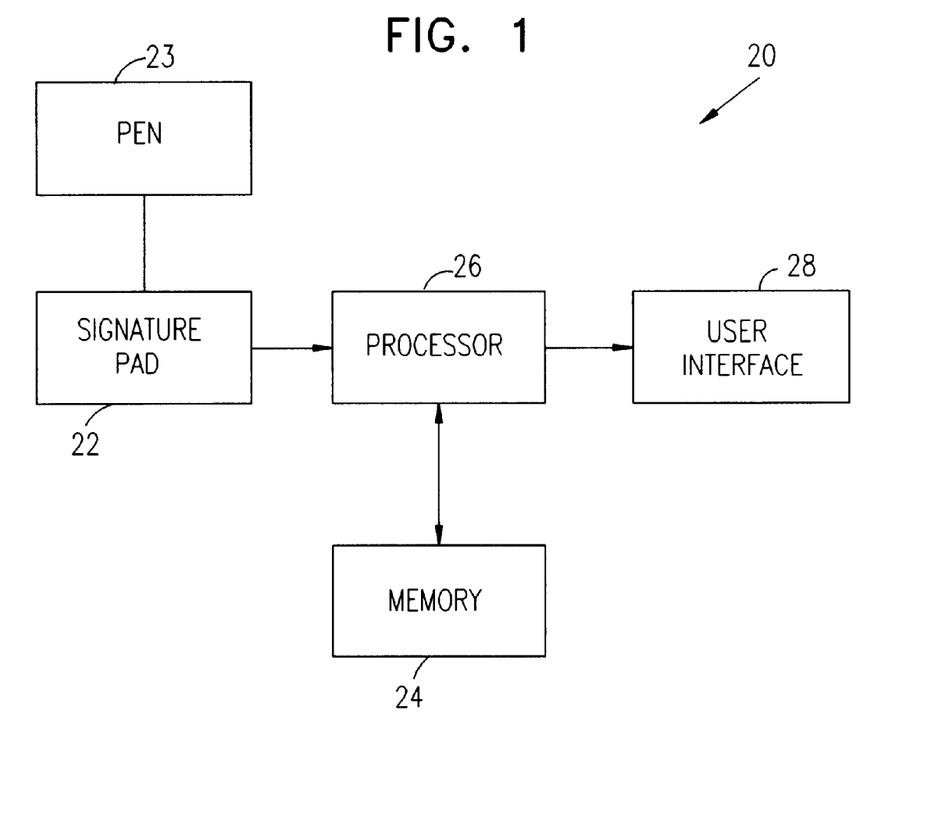
FIG. 1 is a schematic block diagram of a signature verification system, in accordance with a preferred embodiment of the present invention.

FIG. 1 is a schematic block diagram of a signature verification system 20, in accordance with a preferred embodiment of the present invention. System 20 includes a signature receiving pad 22 which inputs signatures to the system. An individual signs, using an appropriate stylus or pen 23, his or her signature on the pad, and the characteristics of the signature are passed to a processor 26. Pad 22 and pen 23 may be, for example, as described in U.S. Pat. No. 5,022,086 or 5,517,579, which are incorporated herein by reference, or as are otherwise known in the art.

Preferably, the characteristics extracted by the pad include sampled points forming the signature, points at which the pen was lifted by the individual, and the time at which the pen was at each sampled point. Alternatively or additionally, the characteristics extracted by the pad include other characteristics, such as the pressure of the pen on the pad at each point. Further alternatively or additionally, pad 22 is replaced by a scanner which provides processor 26 substantially only with the sampled points forming the signature. The scanner allows off-line signature verification, but based only on a limited number of characteristics.

For each individual whose signature is to be verified, a memory 24 receives a plurality of (n) reference signatures known to belong to the individual, either from pad 22 or from a similar source. Alternatively or additionally, more than n reference signatures are acquired by processor 26, which chooses the n reference signatures which are most descriptive of the signature of the individual. Preferably, n+1 signatures are acquired and one reference signature most distinct from the rest of the reference signatures is not stored in memory 24.

Further alternatively or additionally, more than n signatures are acquired, and all the acquired signatures are. stored in memory 24. For each stage of signature verification, as described hereinbelow, processor 26 chooses n signatures to be used for that stage, excluding those signatures which are most distinct for that stage.

Preferably, the signature or signatures farthest from an average signature of all the acquired signatures are determined to be the most distinct signatures for these purposes.

Further alternatively or additionally, a test procedure as described hereinbelow, or a different verification method, is applied to the acquired signatures a plurality of times, each time with a different one of the reference signatures serving as a test signature. Preferably, those signatures classified in the test procedure as 'forgeries' relative to the rest of the reference signatures, are not stored in memory 24. However, if more than a predetermined number of signatures, preferably if more than one signature, are classified in this test as forgeries, the entire set of signatures is rejected as inconsistent.

When a test signature is to be verified, processor 26 receives from pad 22 the test signature and from memory 24 the plurality of reference signatures, and determines whether the test signature belongs to the same individual as the reference signatures using the procedure described hereinbelow. Processor 26 indicates via a user interface 28, such as a LED or speaker, whether the test signature belongs to the individual. Alternatively or additionally, user interface 28 automatically allows access to a privileged system if the signature is identified as authentic. Processor 26 preferably comprises a general purpose computer suitably programmed. Alternatively, processor 26 comprises a dedicated processor especially designed for system 20.

Figure 2:
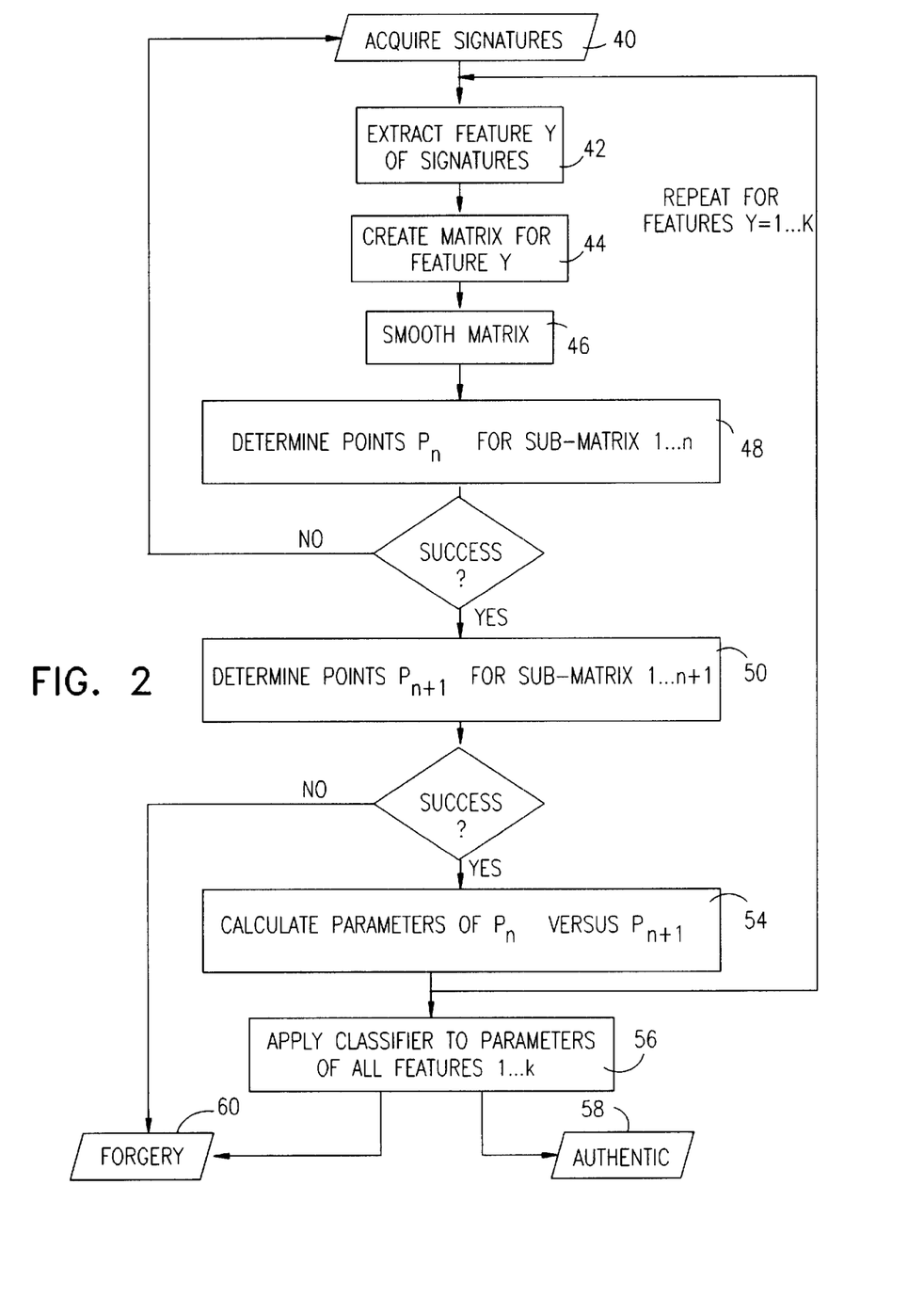
FIG. 2 is a flow chart showing actions performed by the system of FIG. 1, in accordance with a preferred embodiment of the present invention.

FIG. 2 is a flow chart showing actions performed by processor 26 in signature verification, in accordance with a preferred embodiment of the present invention. As indicated in block 40, the n reference signatures and the test signature are loaded into processor 26. The data describing the signatures is processed, as indicated in block 42, to determine values of a number of features (termed features $Y=1 \ldots K$ in the figure) characteristic of the signatures. Preferably, the signatures are processed using a dynamic time warping (DTW) technique, such as is described by M. Hanan, et al., in "Finite State Machine Decision Procedure Model for Signature Verification," *IBM Tech. Discl. Bull.* 20 (1978), pp. 3355–3360; or by M. Yasuara, et al., "Signal Verification Experiment Based on Non-Linear Time Alignment," *IEEE Trans. Sys. Man Cybernetics* 17 (1977), pp. 212–216; or by D. Sankoff and J. B. Kruskal, eds. "Time Warps, String Edits, and Macromolecules: The Theory and Practice of Sequence Comparison," Addison-Wesley, 1983, pp. 125–161. These publications are incorporated herein by reference.

The features representing the signatures include one-dimensional features which are indicative of properties of a single signature, such as the length of the signature, and/or two-dimensional features which are indicative of a correlation value between two signatures.

Preferably, the features used by processor 26 include an absolute speed mismatch, an average speed mismatch, a uniformity point-to-point correspondence and a shape difference, all of which are two-dimensional features. A preferred method of calculating these features is described in an appendix at the end of the present section of the present patent application. Preferably, the features used by processor 26 further include a length of the signature, i.e., the number of acquired points in the signature.

Alternatively or additionally, the features used by processor 26 include one or more of the differences between the values of the following one-dimensional features:

total signature time,
pen-down time ratio,
RMS speed,
RMS centripetal acceleration,
RMS tangential acceleration,
RMS acceleration,
average horizontal speed,
integrated absolute centripetal acceleration,
length-to-width ratio,
horizontal span ratio,
horizontal centroid,
vertical centroid,
a direction histogram,
a direction change histogram, and
a speed correlation.

All these features are described in the above-mentioned book: "Progress in Automatic Signature Verification," edited by R. Plamondon, on page 128. Further alternatively or additionally, other suitable features representative of the signature are used.

Processor 26 may use any number of features although, preferably, only a limited number of features, such as six features, are used in order to limit the calculation complexity imposed on the processor. Alternatively, the number of features used is chosen such that the calculation time required for verifying the test signature is within a suitable limit. Further alternatively or additionally, a user may define the number of features used according to a time-versus-accuracy trade-off.

Preferably, the features of the n reference signatures are determined only once and are thereafter stored together with the signatures. Thus, less calculation time is required to determine whether the test signature is authentic.

Figure 3:
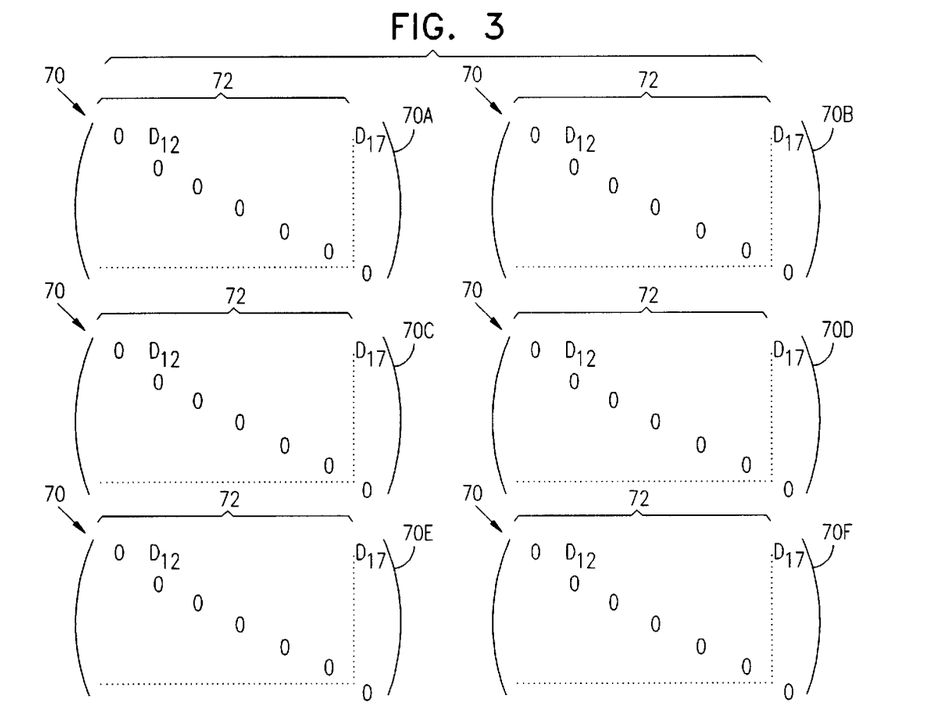
FIG. 3 is a schematic illustration of matrices descriptive of signatures, in accordance with a preferred embodiment of the present invention.

FIG. 3 is a schematic illustration of a plurality of matrices 70 descriptive of respective features of the signatures, in accordance with a preferred embodiment of the present invention. For each of the features used by processor 26, the processor calculates a matrix 70 of dimensions (n+1)×(n+1) in which each term $D_{ij}$ is indicative of the value of the feature for the pair of signatures i,j.

Preferably, the terms of the matrix correspond to two-dimensional features, and the one-dimensional features calculated by processor 26 are used as intermediate values to calculate related two-dimensional features, such as the difference between the values of the one-dimensional features of two different signatures. Alternatively, the two-dimensional feature comprises the average, minimum or maximum of the one-dimensional features. Further alternatively or additionally, the one-dimensional features used in matrix 70 are dependent only on a single signature. Matrices 70 of such features include entire rows or lines which have the same value.

In a preferred embodiment of the present invention, illustrated in FIG. 3, six matrices 70 are used, labeled as matrices 70A, 70B, 70C, 70D, 70E and 70F. Preferably, four matrices 70, for example 70A, 70B, 70C and 70D correspond to the following features: the absolute speed mismatch, the average speed mismatch, the uniformity point-to-point correspondence and the shape difference. The other two matrices 70, i.e., 70E and 70F, correspond to the lengths of the first and second signatures in each pair, respectively.

Preferably, the reference signatures are labeled as signatures 1 . . . n, and signature n+1 is the test signature. Therefore, each matrix 70 includes a sub-matrix 72 which represents only the reference signatures. The values $D_{ii}$ along the main diagonals of matrices 70 are generally zero, corresponding to the differences of the signatures from themselves.

It is noted that for some of the features, matrix 70 is not necessarily symmetrical, for example, matrices 70E and 70F described above. Therefore, as indicated in block 46, in order to simplify subsequent calculations, matrices 70 are preferably altered in order that the matrices will be symmetric. Preferably, each of the terms $D_{ij}$ and $D_{ji}$ of the altered matrices receives the minimum of terms $D_{ij}$ and $D_{ji}$ of the original matrix 70. Alternatively, each term $D_{ij}$ and $D_{ji}$ of the altered matrices receives the average or maximum of $D_{ij}$ and $D_{ji}$ of the original matrix 70. Further alternatively or additionally, a smoothing operator, such as a square root operator, is applied once, twice or more to each of the terms of matrix 70. Preferably, the above altering steps are performed for each matrix 70 according to the specific range of values of the matrix terms.

In a preferred embodiment of the present invention, the matrix terms of the absolute speed mismatch and average speed mismatch are smoothed by applying the square root operator to each term. The uniformity point-to-point correspondence is smoothed using the square root operator on the minimum of $D_{ij}$ and $D_{ji}$, and the shape difference is smoothed using the fourth root operator on the minimum of $D_{ij}$ and $D_{ji}$. The length matrices 70E and 70F are smoothed using the square root operator.

In the next stage, indicated in blocks 48 and 50, for each matrix 70, a unique set of n+1 Euclidean points $(X_1, X_2 \ldots, X_{n+1})$ which is indicative of one or more properties of the matrix, is calculated as described hereinbelow. Preferably, points $X_i$ are n-dimensional points, each point having n coordinates referred to hereinbelow as $(X_{i1}, X_{i2}, \ldots, X_{in})$.

Preferably, points $(X_1, X_2 \ldots, X_{n+1})$ are calculated such that each term $D_{ij}$ of matrix 70 is equal to the distance between points $X_i$ and $X_j$ of the respective set of points. Preferably, the distance is the Euclidean distance. Alternatively or additionally, any other distance definition may be used. Equation (1) formally states the relation between the terms of matrix 70 and the set of points:

$$D_{ij} = \|X_i - X_j\| = \sqrt{\sum_{m=1}^{n} (X_{im} - X_{jm})^2} \quad (1)$$

Further preferably, the set of points $\{X_i\}$ are generated from the matrix such that a first point $X_1$ is at the origin and each subsequent point $X_i$ has one more non-zero coordinate than the previous point $X_{i-1}$.

Preferably, points $\{X_k\}$ are generated recursively according to equation (2):

$$X_{k,j} = \begin{cases} \dfrac{\alpha}{2X_{j+1,j}} + \dfrac{X_{j+1,j}}{2} & j = 1 \ldots k-2 \\ \sqrt{D_{1,k}^2 - \sum_{i=1}^{k-2} X_{k,i}^2} & j = k-1 \\ 0 & j = k \ldots n \end{cases} \quad (2)$$

in which:

$$\alpha = \sum_{i=1}^{j-1}[(X_{j+1,i} - X_{k,i})^2 - (X_{j,i} - X_{k,i})^2] - D_{j+1,k}^2 + D_{j,k}^2 \quad (3)$$

Thus, the first n points of the set form a polyhedron $P_n$ in n−1-space which is representative of properties of sub-matrix 72. The entire set of points forms a polyhedron $P_{n+1}$ in n-space which is representative of properties of matrix 70.

Alternatively or additionally, two separate sets of points are generated, a first set which includes n points and forms polyhedron $P_n$ which is representative of properties of sub-matrix 72, and a second set of points which includes n+1 points and forms polyhedron $P_{n+1}$ which is representative of properties of matrix 70. Polyhedrons $P_n$ and $P_{n+1}$ are indicative of the compactness and/or regularity of the respective matrix 70.

In some cases it is not possible to produce a set of points which fulfills equation (1) for a specific matrix 70. For example, the term under the square root sign in equation (2) may be negative. If polyhedron $P_n$, representative of the reference signatures, cannot be generated, the reference signatures are inconsistent and do not have any regularity in terms of the features under consideration. Therefore, it is not possible to determine whether the test signature is authentic. Preferably, the owner of the reference signatures is requested to provide a new set of reference signatures, which is hoped to be more consistent, so that his signature may be verified. If polyhedron $P_n$ may be generated, but polyhedron $P_{n+1}$ cannot be generated, the test signature is very different from the reference signatures and is therefore immediately known to be a forgery.

Table 1 below shows a matrix A representing the speed mismatch feature of three reference signatures and an authentic test signature. Table 2 is a matrix F representing the same feature of the same three reference signatures together with a forged test signature.

TABLE 1

$$A = \begin{pmatrix} 0.000000 & 5.165768 & 5.625763 & 5.911804 \\ 5.165768 & 0.000000 & 6.232273 & 5.982706 \\ 5.625763 & 6.232273 & 0.000000 & 5.888030 \\ 5.911804 & 5.982706 & 5.888030 & 0.000000 \end{pmatrix}$$

TABLE 2

$$F = \begin{pmatrix} 0.000000 & 5.165768 & 5.625763 & 7.106720 \\ 5.165768 & 0.000000 & 6.232273 & 8.297473 \\ 5.625763 & 6.232273 & 0.000000 & 8.649035 \\ 7.106720 & 8.297473 & 8.649035 & 0.000000 \end{pmatrix}$$

As can be appreciated, matrices A and F have a common 3×3 sub-matrix at their upper left which is representative of the reference signatures. A set of points corresponding to matrices A and F are summarized in table 3:

TABLE 3

$X_1$ = (0.000000 0.000000 0.000000)
$X_2$ = (5.165768 0.000000 0.000000)
$X_3$ = (1.886762 5.299938 0.000000)
$X_A$ = (2.501257 2.121836 4.918430)
$X_F$ = (0.807487 0.405837 7.049024)

$X_1$, $X_2$, and $X_3$ correspond to the reference signature, $X_A$ corresponds to the authentic test signature, and $X_F$ corresponds to the forged test signature.

Figure 4:
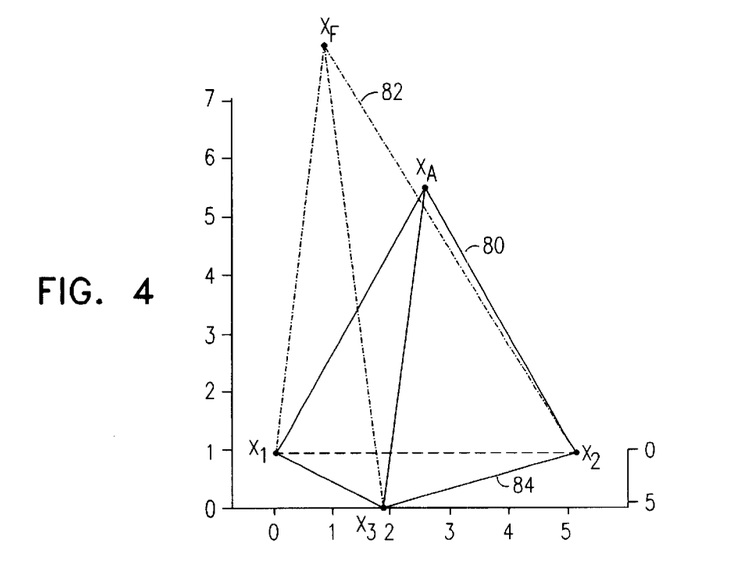
FIG. 4 is a schematic graph of points which represent signatures used in verification, in accordance with a preferred embodiment of the present invention.

FIG. 4 is a schematic graph of points $X_1$, $X_2$, $X_3$, $X_A$, and $X_F$. A polyhedral 80 shows $P_{n+1}$ when $X_A$ represents the test sample, and is formed of points $X_1$, $X_2$, $X_3$, and $X_A$. Likewise, a polyhedral 82 shows $P_{n+1}$ when $X_F$ is used to represent the test sample, and is formed of points $X_1$, $X_2$, $X_3$, and $X_F$. It will be observed that polyhedral 80 has a more regular shape than polyhedral 82, i.e., polyhedral 80 is generally closer to an equilateral and equiangular shape than polyhedral 82. To determine whether each of the test signatures is authentic or forged, processor 26 examines the regularity of polyhedrals 80 and 82. Methods for quantitatively examining the regularity are described further hereinbelow. Alternatively or additionally, processor 26 compares the regularity of polyhedrals 80 and 82 to the regularity of polyhedral $P_n$ 84 which includes only points $X_1$, $X_2$, and $X_3$, which correspond to the reference signatures.

Preferably, as indicated in block 54 of FIG. 2, the regularity of polyhedral $P_{n+1}$ is determined by calculating one or more parameters indicative of the similarity between the polyhedrals $P_n$ and $P_{n+1}$. Alternatively or additionally, the one or more parameters are indicative of the regularity of polyhedral $P_{n+1}$ without reference to polyhedral $P_n$.

Preferably, one of the one or more parameters is based on a height $H(P_k, X_i)$ which equals, the distance between point $X_i$ and a hyperplane defined by the remaining points of $P_k$. Preferably, height $H(P_k, X_i)$ is calculated rapidly by determining the points of polyhedral $P_k$ such that $X_i$ is the only point for which the n-th coordinate is non-zero. The n-th coordinate of $X_i$ is then equal to the height $H(P_k, X_i)$. Alternatively, height $H(P_k, X_i)$ is calculated using geometrical methods known in the art, for example, as described in Granio A. Korn and Theresa M. Korn, "Mathematical Handbook for Scientists and Engineers" second edition, McGraw-Hill Book Company, 1968, which is incorporated herein by reference.

Preferably, the parameter H based on the height is, as described in equation (4), given by the ratio of the height $H_{n+1} \equiv H(P_{n+1}, X_{n+1})$ of polyhedral $P_{n+1}$ to the height $H_n$ of polyhedral $P_n$:

$$H = \frac{H_{n+1}}{H_n} \quad (4)$$

$H_n$ is preferably equal to the average of the distances between each of the points $X_i$ of polyhedral $P_n$ and the rest of the points of the polyhedron, as described in equation (5) below:

$$H_n = \frac{\sum_{i=1}^{n} H(P_n, X_i)}{n} \quad (5)$$

Alternatively, $H_n$ is determined using an arbitrary point on $P_n$. Further alternatively, H is given simply by $H = H_{n+1}$.

Further preferably, another one of the one or more parameters is based on a variance $V(P_k, X_i)$ as defined in equation (6):

$$V(P_k, X_i) = \frac{\|X_i - O_k\|}{\sigma_k} \quad (6)$$

in which $O_k$ is a center of mass of $P_{n+1}$, preferably as defined by equation (7):

$$O_k = \frac{1}{k}\sum_{i=1}^{k} X_i \quad (7)$$

and $$\sigma_k = \sqrt{\frac{1}{k+const}\sum_{i=1}^{k}\|X_i - O_k\|^2} \quad (8)$$

in which const is preferably equal to either 0 or −1.

Preferably, the parameter V based on the variance $V(P_k, X_i)$ is given by the ratio of the variance $V_{n+1}$ of polyhedral $P_{n+1}$ and a variance $V_n$ of polyhedral $P_n$. Similarly to $H_n$, $V_n$ is preferably equal to the average of the variances between each of the points $X_i$ of polyhedron $P_n$ and the remaining points of the polyhedron. Alternatively, Vn is determined using an arbitrary point of Pn.

Alternatively or additionally, the one or more parameters include a parameter based on a "height-to-area" variance $HA_{n+1}$ which is indicative of a ratio between the height and the surface area of the polyhedral. Variance $HA_{n+1}$ is preferably: as defined by equation (9):

$$HA_{n+1} = \frac{\|X_{n+1} - O_{n+1}\|}{\sqrt[n]{volume(P_{n+1})}} \quad (9)$$

in which volume($P_{n+1}$) is the volume of polyhedral $P_{n+1}$. Preferably, the volume is calculated using methods known in the art, for example as described in the above-mentioned Mathematical Handbook.

Further alternatively or additionally, the one or more parameters include a measure of the ratio between the surface area and volume of the polyhedral and/or a measure of the ratio between the height and volume of the polyhedral.

In a preferred embodiment of the present invention, the one or more parameters include two parameters, preferably H and V. Thus, each matrix 70 is represented by two parameters which are indicative of the regularity of the matrix. Preferably, the parameters of all the matrices 70 are fed into a classifier which determines whether the signature is authentic, as indicated by block 56 of FIG. 2. Preferably, the classifier comprises a software package running on processor 26. Alternatively, the classifier comprises dedicated hardware, as is known in the art. Preferably, the classifier comprises a neural network which is trained using a database of authentic and forged signatures. Preferably, the neural network comprises a Boltzmann Perceptron, such as described, for example, in Eyal Yair and Allen Gersho, "The Boltzmann Perceptron Network—a Soft Classifier," in Journal of Neural Networks, Vol. 3 (March, 1990), 203–221, which is incorporated herein by reference. Alternatively, the neural network comprises a back-error propagation network with one or more hidden layers.

Preferably, the database for training the neural network comprises between 20 and 100 sets of signatures, each of which includes between five and ten authentic signatures and between one and three forgeries. Preferably, the forgeries are performed by a number of experts, so that the differences between the authentic and forged signatures are relatively small. Thus, the neural network will better learn to differentiate between similar signatures.

Alternatively or additionally, the classifier comprises an ID tree, such as the ID3 classifier, which is described by J. Ross Quinlan, in "C4.5 Programs for Machine Learning,", Morgan Kaufmann (1993), ISBN 1558602380, which is incorporated herein by reference.

It is noted that a test signature very close to one of the reference signatures will not be accepted as an authentic signature, since it does not relate substantially equally to all the reference signatures, and the polyhedral $P_{n+1}$ will therefore not have the same regularity as $P_n$. Thus a forger copying precisely one of the reference signatures will be detected.

Although the preferred embodiment described hereinabove deals with a signature verification system, the principles of the present invention may be used in various applications of pattern matching in which a few samples are compared. In particular, the principles of the present invention may be used in verification of the authenticity of other types of samples, such as human speech, finger prints, and retinal images. It is noted that the present invention makes it possible to perform reliable verification using relatively few samples.

Those skilled in the art will appreciated that many variations are possible on the above-described calculations and definitions, for example, in accordance with methods disclosed in the above-mentioned book. It will further be appreciated that some or all aspects of the present invention may be realized in hardware, software, or a combination of hardware and software. Those aspects realized as software will, when executed by a suitable processor, such as processor 26, enable the processor to control a system such as system 20 so as to perform the methods described hereinabove. The software may be supplied either via a communications link to the processor or on a tangible medium, such as diskette or CD-ROM.

It will be appreciated that the preferred embodiments described above are cited by way of example, and the full scope of the invention is limited only by the claims.

Appendix

In a preferred method for calculating values associated with signature features, a signature $S_k$ is formed of a plurality of points, which are represented by a set of two dimensional coordinates $\{(x_{k1}, y_{k1}), (x_{k2}, y_{k2}), \ldots, (x_{kn_k}, y_{kn_k})\}$. (Here $n_k$ is the length of signature $S_k$, i.e., the number of sample points forming signature $S_k$). This notation is summarized in equation (10):

$$S_k=\{X_k,Y_k\},\ X_k=\{x_{k1},x_{k2},\ldots,x_{kn_k}\},\ Y_k=\{y_{k1},y_{k2},\ldots,y_{kn_k}\} \quad (10)$$

The speed of signature Sk is defined in equation (11):

$$V_k=\sqrt{\dot{X}_k^2+\dot{Y}_k^2},\ V_k=\{v_{k1},v_{k2},\ldots,v_{kn_k}\} \quad (11)$$

and comprises for each point($x_{kj}$, $y_{kj}$) of the signature, a speed of the point, $v_{kj}$.

An average speed of the signature is defined in equation (12):

$$\overline{V}_k = \frac{1}{n_k}\sum_{j=1}^{n_k} v_{kj} \qquad (12)$$

and a standard deviation of the speed is defined in equation (13):

$$\sigma_k = \frac{1}{n_k+c}\sum_{j=1}^{n_k} (v_{kj}-\overline{V}_k)^2 \qquad (13)$$

in which c is an integer constant, preferably −1 or 0.

The absolute speed mismatch $ABSM_{k,l}$ of two signatures $S_k$ and $S_l$ is defined in equation (14):

$$ABSM_{k,l} = \sigma_k \cdot ABSM_{k,l}(n_k, n_l) \qquad (14)$$

wherein $n_k$ and $n_l$ are the lengths of signatures $S_k$ and $S_l$, respectively. $ABSM_{k,l}(n_k,n_l)$ is preferably calculated recursively in accordance with equation (15):

$$ABSM_{k,l}(i,j) = \mathrm{Min}\begin{cases} ABSM(i-1,j) + d\tau w(i,j) \\ ABSM(i-1,j-1) + \tau w(i,j) \\ ABSM(i,j-1) + d\tau w(i,j) \end{cases} \qquad (15)$$

wherein t, d are constants, and $w(i,j) = |v_{ki} - v_{lj}|$. Equation (15) is preferably solved using methods and continuity constraints described in the above-mentioned book: "Time Warps, String Edits, and Macromolecules: The Theory and Practice of Sequence Comparison."

Preferably, t=1, and d is either 0.5 or 1, although other suitable values of t and d are acceptable.

The uniformity point-to-point correspondence of a pair of signatures is preferably defined as the length of the path of the DTW table formed in performing the DTW on the pair of signatures, as described on page 147 of the above-mentioned book. The average speed mismatch is preferably the ratio between the absolute speed mismatch and the uniformity point-to-point correspondence.

The shape difference between a pair of first and second signatures is preferably defined as the minimal Euclidean distance between the first signature and any affine transform of the second signature.

What is claimed is:

1. A method of determining whether a test sample belongs to the same individual as a plurality of reference samples, comprising:
   providing respective values of one or more identifying features from the test sample and the plurality of reference samples;
   representing the test and reference samples by respective points having coordinates in a multi-dimensional space indicative of the respective feature values, so as to define a polyhedron in the multi-dimensional space; and
   deciding whether the test sample belongs to the same individual as the plurality of reference samples based on a geometrical property of the polyhedron.

2. A method according to claim 1, wherein providing the respective values comprises extracting from the samples a plurality of values of the one or more features descriptive of the samples, and wherein representing the samples by one or more geometric points comprises representing each sample by one point for each of the one or more features.

3. A method according to claim 2, wherein at least some of the one or more features comprise a value dependent on a comparison of two of the samples.

4. A method according to claim 2, wherein representing each of the test and reference samples by one or more geometric points comprises generating for each of the one or more features, a square matrix in which each row and each column is representative of one of the samples, and in which the values of the terms of the matrix are responsive to the value of the feature of the samples of the row and column of the term, and generating for each matrix a plurality of points representative of the matrix.

5. A method according to claim 4, wherein generating the plurality of points representative of the matrix comprises smoothing the matrix and generating the points based on the smoothed matrix.

6. A method according to claim 5, wherein smoothing the matrix comprises applying a square root operator to the terms of the matrix.

7. A method according to claim 5, wherein smoothing the matrix comprises generating a symmetrical matrix responsive to the matrix to be smoothed.

8. A method according to claim 1, wherein representing the test and reference samples by respective points comprises generating the points such that the distances between the points are proportional to the respective values of the features.

9. A method according to claim 1, wherein deciding based on the geometrical property of the polyhedron comprises deriving a parameter indicative of the regularity of the polyhedron.

10. A method according to claim 9, wherein deriving the parameter comprises deriving parameters indicative of the relative form of a polyhedron including points representing both the test and reference samples compared to a polyhedron including points representing only the reference samples.

11. A method according to claim 10, wherein deriving parameters indicative of the relative form of the polyhedrons comprises deriving relative heights and variances of the polyhedrons.

12. A method according to claim 10, wherein deciding whether the test sample belongs to the same individual as the reference samples comprises inputting the parameters to a classifier.

13. A method according to claim 12, wherein the classifier comprises a neural network.

14. A method according to claim 1, wherein the samples comprise signatures.

15. A method according to claim 14, wherein providing the respective values comprises determining a speed mismatch of the samples.

16. A method according to claim 1, wherein providing the respective values comprises performing a dynamic time warping technique on the samples.

17. A method according to claim 1, wherein representing the test and reference samples by the respective points comprises representing the samples by n-dimensional points wherein n is the number of reference samples.

18. A method according to claim 17, wherein representing the test and reference samples by the respective points comprises representing the samples such that each of the points has a different number of non-zero coordinates.

19. A method according to claim 18, wherein the test sample is represented by a point substantially all of whose coordinates are non-zero.

20. A method according to claim 1, and comprising eliminating one or more of the reference samples prior to representing the test and reference samples by the respective points.

21. Apparatus for determining whether a test sample belongs to the same individual as a plurality of reference samples, comprising:

an input device which acquires the samples;

a processor which determines values of one or more features of the samples, represents the samples by corresponding points in a multi-dimensional space having coordinates indicative of the feature values, so as to define a polyhedron in the multi-dimensional space, and calculates a geometrical property of the polyhedron; and a classifier which determines whether the test sample belongs to the same individual as the plurality of reference samples responsive to the geometrical property.

22. Apparatus according to claim 21, wherein the samples comprise signatures, and the input device comprises a writing implement.

23. Apparatus according to claim 22, wherein the input device does not determine a pressure of the writing implement on a pad.

24. Apparatus according to claim 21, wherein the classifier comprises a neural network.

25. Apparatus according to claim 21, wherein the classifier is implemented by software in the processor.

26. Apparatus according to claim 21, wherein the processor represents each sample by one point for each of the one or more features.

27. Apparatus according to claim 21, wherein the processor determines values of the one or more features using a dynamic time warping technique.

28. Apparatus according to claim 21, wherein the processor calculates the geometrical property by deriving parameters indicative of the relative form of a polyhedron including points representing both the test and reference samples compared to a polyhedron including points representing only the reference samples.

29. A computer program product having computer readable program code embodied therein, which code causes a processor receiving a test sample and a plurality of reference samples, wherein each sample is characterized by respective values of one or more identifying features, to represent the test and reference samples by respective points having coordinates in a multi-dimensional space indicative of the respective feature values, so as to define a polyhedron in the multi-dimensional space, and to decide whether the test sample belongs to the same individual as the plurality of reference samples based on a geometrical property of the polyhedron.

* * * * *